US009572307B2

(12) United States Patent
Mermelstein

(10) Patent No.: US 9,572,307 B2
(45) Date of Patent: Feb. 21, 2017

(54) SYSTEMS AND METHODS UTILIZING AN OVERHEAD PLANT TRAINING SCREEN

(71) Applicant: Gary Alan Mermelstein, Jonestown, TX (US)

(72) Inventor: Gary Alan Mermelstein, Jonestown, TX (US)

(73) Assignee: SCROGGER, LLC, Leander, TX (US)

( * ) Notice: Subject to any disclaimer, the term of this patent is extended or adjusted under 35 U.S.C. 154(b) by 51 days.

(21) Appl. No.: 14/754,320

(22) Filed: Jun. 29, 2015

(65) Prior Publication Data

US 2016/0249536 A1   Sep. 1, 2016

Related U.S. Application Data

(60) Provisional application No. 62/120,979, filed on Feb. 26, 2015.

(51) Int. Cl.
*A01G 17/06* (2006.01)
*A01G 9/12* (2006.01)

(52) U.S. Cl.
CPC ............... *A01G 9/12* (2013.01); *A01G 9/124* (2013.01)

(58) Field of Classification Search
CPC .......... A01G 9/12; A01G 9/022; A01G 17/06; A01G 9/128; A01G 9/124
USPC .......................................................... 47/47
See application file for complete search history.

(56) References Cited

U.S. PATENT DOCUMENTS

| | | | | |
|---|---|---|---|---|
| 1,055,914 | A * | 3/1913 | Hus | A01G 9/12 47/45 |
| 1,480,917 | A * | 1/1924 | Robinson | A01G 17/06 47/44 |
| 2,530,015 | A * | 11/1950 | Kouri | A01G 13/0206 47/46 |
| 2,745,219 | A * | 5/1956 | Olsen | A01G 9/12 47/47 |
| 2,974,662 | A * | 3/1961 | Forrest | A47J 37/0709 126/30 |
| 9,060,469 | B2 * | 6/2015 | Kamon, II | A01G 17/04 |
| 2011/0197505 | A1 * | 8/2011 | Hansen | A01G 9/12 47/65.8 |
| 2012/0055083 | A1 * | 3/2012 | Marquez | A01G 9/12 47/45 |
| 2012/0227318 | A1 * | 9/2012 | Harger | A01G 9/12 47/46 |
| 2013/0062478 | A1 * | 3/2013 | Kamon, II | A01G 9/124 248/129 |
| 2014/0196365 | A1 * | 7/2014 | Washington | A01G 9/124 47/66.6 |
| 2014/0305040 | A1 * | 10/2014 | Hall | A01G 9/12 47/65.5 |
| 2016/0135385 | A1 * | 5/2016 | Wang | A01G 17/04 47/44 |
| 2016/0286733 | A1 * | 10/2016 | Fair | A01G 9/12 |

* cited by examiner

*Primary Examiner* — Kristen C Hayes
(74) *Attorney, Agent, or Firm* — Pierson IP, PLLC

(57) ABSTRACT

Examples of the present disclosure are related to systems and methods to redirect vertical growth of flowering plants. In embodiments, a portable growing system may redirect vertical growth of plants in a late vegetative stage and in an early flower stage. This may allow lower budding sites positioned within the portable growing system to receive substantially the same amount of light as higher budding sites positioned within the portable growing system.

9 Claims, 6 Drawing Sheets

SYSTEMS AND METHODS UTILIZING AN OVERHEAD PLANT TRAINING SCREEN

CROSS-REFERENCE TO RELATED APPLICATIONS

This application claims a benefit of priority under 35 U.S.C. §119 to Provisional Application No. 61/120,979 filed on Feb. 26, 2015 which is fully incorporated herein by reference in its entirety.

BACKGROUND INFORMATION

Field of the Disclosure

Examples of the present disclosure are related to systems and methods to control and redirect vertical growth of flowering plants. More particularly, embodiments relate to a dynamic and portable overhead plant training system with adjustable screens, wherein the screens are configured to allow lower budding sites (older sites) to receive substantially the same amount of light as higher budding sites (younger sites).

Background

The proliferation of urban gardening has spawned techniques that help maximize crop yields in restricted space, such as the space restrictions experienced by indoor gardeners. During the process of indoor gardening plants are grown in individual stationary containers and placed together in a space that delivers their environmental needs.

Some gardeners may place a fixed height and stationary screen above the stationary containers. Conventionally, the mesh screen is configured to redirect the vertical growth of the plant to a horizontal plane in late vegetative and early flowering stages. However, conventional growing methods also require stationary containers with fixed screens, wherein the screens are positioned at a fixed and stationary height. This creates a number of inefficiencies during the growing process. The inefficiencies may be due to different plants having different environmental needs, such as distance of light source to flowering sites, lighting cycles, temperatures, humidity, health or insect issues, varying growth rates, etc.

Accordingly, needs exist for more effective and efficient systems and methods for adjustable overhead plant training screens being coupled with a portable container that allows the gardener to cater to the needs of a single plant.

SUMMARY

Examples of the present disclosure are related to systems and methods to redirect vertical growth of plants to horizontal growth. In embodiments, a portable growing system may redirect vertical growth of plants in a late vegetative stage and in an early flowering stage. An adjustable screen may allow lower (older) budding sites positioned within the portable growing system to receive substantially the same amount of light as higher (younger) budding sites positioned within the portable growing system.

Utilizing the portable growing system, growers may remove, introduce, and/or reintroduce plants to a grow space. Additionally, plants and screens may be undisturbed and plant damage may be avoided when positioning the portable growing system with other plants in the space.

In embodiments, the portable growing system may be configured to allow single plants to be removed from or positioned within a grow space without cutting the plant, any adjacent plants, or the screen itself. Accordingly, the portable growing system may increase crop yields, while also reducing grow space requirements because plant growers may plan and build grow spaces (rooms, facilities, green houses, grow cabinets etc.) that are more effective and efficient.

Plants may be removed from a grow space for a plurality of different reasons, such as: disease, mold, insects, undesirable sex or hermaphroditism, light cycles, maturity, transfer to cutting room, transfer to another facility, sale, etc. Additionally, plants may be placed in a grow space environment for a plurality of different reasons, such as: cloning, mature seedlings, transferring from another facility, purchase, reintroduction of rehabilitated plants, end of life cycle, etc.

In embodiments, the portable growing system may include a screen. The screen may be configured to be adjusted in multiple planes. The screen may be configured to be adjusted along a vertical axis above budding sites, wherein the vertical positioning of the screen may be based on a plurality of factors, including: light, grow medium, plant type, vegetative stage, flowering stage, etc. The size of the perimeter of the screen may be adjusted based on a plurality of factors, wherein the size of perimeter of the screen may be increased.

In embodiments, the portable growing system may utilize an artificial light source. The artificial light source may be lowered to reflect more intense light rays to a broader budding surface area.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
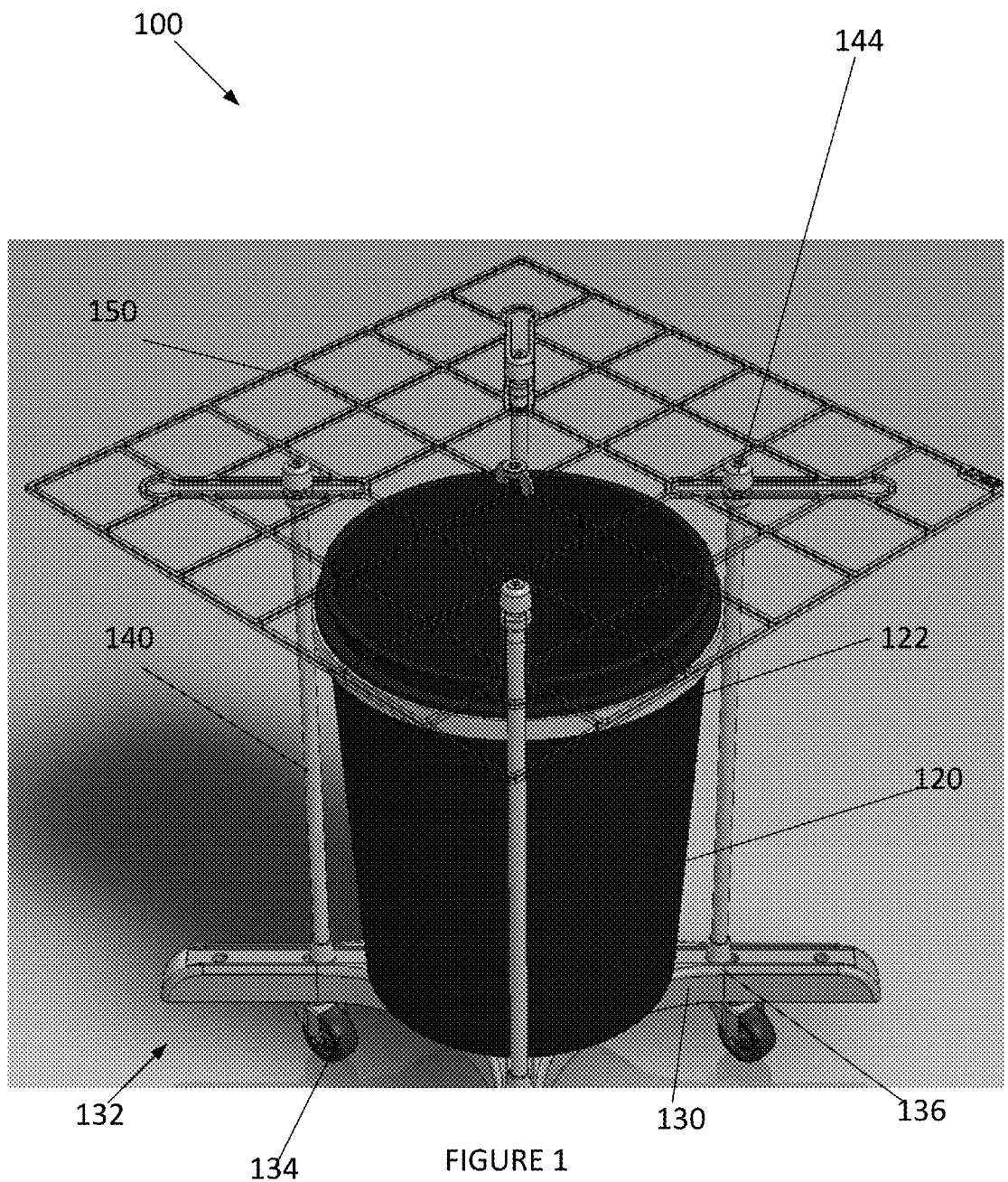
FIG. 1 depicts a portable growing system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Examples of the present disclosure are related to systems and methods to redirect vertical growth of flowering plants. In embodiments, a portable growing system may redirect vertical growth of plants in a late vegetative stage and in an early flowering stage to horizontal growth. The portable growing system may include an adjustable screen. The adjustable screen may be positioned above budding sites such that the tips of plants branches are kept at a same level. The adjustable screen may allow for even light distribution to all of the nodes and budding sites of a plant. Once the flowering stage begins for the plants, the flower tips for each of the plants may extend through their individual screen opening, where they may be positioned equal distance from a light source.

FIG. 1 depicts one embodiment of a portable growing system 100. The portable growing system 100 may be utilized in screen of green (SCROG) environment. Utilizing the portable growing system 100 the health of the plants may be improved while also increasing the resulting crop yield. Also, utilizing the portable growing system space requirements are reduced.

Portable growing system 100 may include a light source (not shown, a container 120, a base 130, vertical supports 140, and screen 150.

The light source may be natural light or artificial light. A plant may cycle through light periods and dark periods, wherein during the light periods the artificial light source may be turned on, and during the dark periods the light source may be turned off.

Container 120 may be a bucket, pot, box, etc. that is configured to hold a plant, buds, grow medium, seeds, plant material, etc. while the plant is growing. Container 120 may be shaped and/or sized to enforce the geometric distribution of the plant, buds, flowers, etc. with environmental factors, such as lighting. Container 120 may be round or square in shape. In embodiments, container 120 may be positioned below the light source.

Container 120 may include a rim support 122 that is configured to encompass a perimeter of container 120. Rim support 122 may be comprised of a portion of a hook and loop coupling mechanism, such as Velcro. However, in different embodiments rim support 122 may be any type of removable coupling mechanism such as a button, snap, buckle, etc.

Base 130 may be a support structure that is configured to support the elements of portable growing system, wherein base 130 may be positioned below container 120. In embodiments base 130 may include support structures 132, castors 134, and channels 136.

Support structures 132 may be planks of wood, plastic, metal or any other solid material configured to support other elements of portable growing system 100. Support structures 132 may extend past a perimeter of container 120. In embodiments, an upper surface of support structures 132 may be positioned adjacent to a lower surface of container 120. Accordingly, container 120 may be configured to sit on support structures 132, wherein support structures 132 form a wider perimeter than container 120.

Castors 134 may be wheels configured to be positioned on a lower surface of support structure 132. Castors may be constructed of metal, plastic or other material. Castors 134 may be configured to allow portable growing system 100 to be transported from a first location to a second location. Castors 134 may be configured to automatically align themselves based on the direction of travel of growing system 100, such that portable growing system 100 may be rolled in a plurality of different directions. Castors 134 may include locking mechanisms that are configured to restrict the movement of the wheels, such that when the locking mechanisms are engaged, portable growing system 100 may not be able to be moved.

Channels 136 may be positioned on an upper surface of support structures at a location adjacent to a lower perimeter of container 120. Channels 136 may be configured to couple with a vertical support 140. When a vertical support 140 is coupled with channels 136, the vertical support 140 may be secured in place in a position that is perpendicular to base 130. In embodiments, channels 136 may extend across the length of support structures 132, and may have an inner groove that is no wider than the diameter of a base of vertical support 140. Therefore, the base of vertical support 140 may be inserted into the groove of a channel 136.

Vertical supports 140 may be poles, shafts, beams, etc. configured to couple with container 120, base 130, and screen 150. A first end of vertical support 140 may be configured to couple with base 130, and a second end of vertical support may be configured to couple with screen 150, wherein the second end of vertical support 140 is positioned above a top surface of container 120.

Vertical supports 140 may have telescopic shafts that are comprised of two parts, wherein a first part may be configured to slide in and out of the second part. By moving the first part of vertical support 140, the length of vertical support 140 may be increased or decreased. In embodiments, the length of the vertical support may be adjusted vertically above the top surface of container 120. Vertical support 140 may be configured to be extended by rotating its upper shaft in a first direction, and vertical support 140 may be configured to be retracted by rotating its uppers shaft in a second direction.

One skilled in the art will appreciate that vertical support 140 may be extended or retracted by any known manner. For example, vertical supports 140 may include locking mechanism, wherein when the locking mechanism is disengaged the first portion may be extended or retracted and when the locking mechanism is engaged the first portion may be secured in a fixed location. Accordingly, the length of vertical supports 140 may be dynamically changed.

Vertical supports 140 may be configured to be coupled with channels 136, container 120, and screen 150. Vertical supports 140 may have a slightly smaller circumference than the grooves within channels 136, such that vertical supports 140 may be slid into channels 136. Responsive to vertical supports 140 being slid into channels 136, the friction caused by channels 136 against vertical supports 140 may secure a first end of vertical supports within base channels 136.

When vertical supports 140 are coupled with base attachments 136, vertical supports may extend upwardly in a direction perpendicular to base 130, wherein vertical supports 140 may be positioned adjacent to a perimeter of container 120. A portion of a perimeter of vertical support 140 may include coupling mechanism 122. Coupling mechanism 122 may be a second part of a hook and lock structure, such as Velcro. Responsive to positioning vertical support 140 within channel 136, a coupling mechanism 122 may be configured to couple vertical support 140 and container 120 via rim support 122.

Second ends of vertical supports 140 may be configured to couple with screen 150. Screen 150 may be a screen with an optimal opening size. A grower may utilize screen 150 to train plants. Utilizing a surface area of screen 150, a grower may expose flowering plants within container 120 that have upper and lower flowering sites to substantially the same amount of light. In embodiments, screen 150 may be substantially square in shape, wherein screen 150 is comprised of smaller squared regions.

Screen 150 may be configured to be positioned above container 120, wherein the height of screen 150 may be adjusted based on plants within container 120. Screen 150 may form a planar surface, wherein the perimeter of screen 150 may be greater than the perimeter of container 120. Accordingly, the tips of a plant positioned within container 120 may be kept at the same planar level according to screen 150. Once a flowering stage begins for the plant positioned within container 120, the flower tips may reach through screen 150. Thus, the flowers and buds may be a relative equidistance from light source 110.

More so, screen 150 may be configured to enforce the geometric distribution of flowers and plant material above budding sites within container 120. Based on the requirements of plants positioned within container 120, the height of the planar surface of screen 150 may be adjusted by modifying the height of each of the vertical supports 140. Accordingly, different plants positioned within different containers 120 in the same grow space may have screens 150 positioned at different heights, which may allow for more effective and efficient growing of different plants in the same space.

In embodiments, may include a plurality of slots positioned on screen 150. Each of the plurality of slots may be configured to receive and secure a vertical support 140 in place. Each of the slots may have a first end point positioned proximate to a corner of screen 150, and be angled towards the center of screen 150, wherein a second end of the slots may be positioned more proximate to the center of screen 150.

The first ends of the slots may be wide enough so that the cap 144 of a vertical support 140 may pass through. The longitudinal axis of the slots may have a narrower passageway than the first end of the slots. Therefore, once a cap 144 of vertical support 140 is inserted through the first end of the slot, cap 144 of vertical support 140 may slide into the longitudinal axis. However, cap 144 of vertical support 140 may not be removed from the slot when not positioned at the first end of the slot due to the difference in width between the first end of the slot and the longitudinal axis of the slot. Accordingly, cap 144 of vertical support 140 may only be inserted and removed from screen 150 when aligned with the first end of the corresponding slot.

The slots may have a length that is substantially long enough, such that portable growing system 100 may be utilized with containers of different shapes and/or sizes. When in use, a plurality of vertical supports may be positioned adjacent to the sidewalls of a container, and interface with the slots at positions that correspond with the dimensions of the container 120. Accordingly, via the slots and screen 150, portable growing system 100 may support a plurality of different shaped or sized containers.

In embodiments, each of the outer edges of screen 150 may include a groove, slot, channel, etc. (not shown). The grooves may be configured to receive and secure a screen attachment. Responsive to positioning the screen attachment within the grooves, the screen attachment may be coupled to screen 150 to form a screen with a larger surface area.

In embodiments, as the plants begin to grow and spread at the planar surface defined by screen 150, buds sites that are positioned below the higher flowering buds may be trained to grow away from the center of screen 150. Accordingly, the buds may be trained to grow and flower along the new, larger perimeter of screen 150 defined by the screen attachment. Thus exposing most bud sites to substantially the same light intensity.

In embodiments, a wider perimeter of screen 150 may be created by positioning attachment member within the grooves on the perimeter of screen 150. Furthermore, the attachment member may be positioned adjacent to the perimeter of screen 150, such that the attachment member and screen 150 form a continuous screen with a planar surface.

Figure 2:
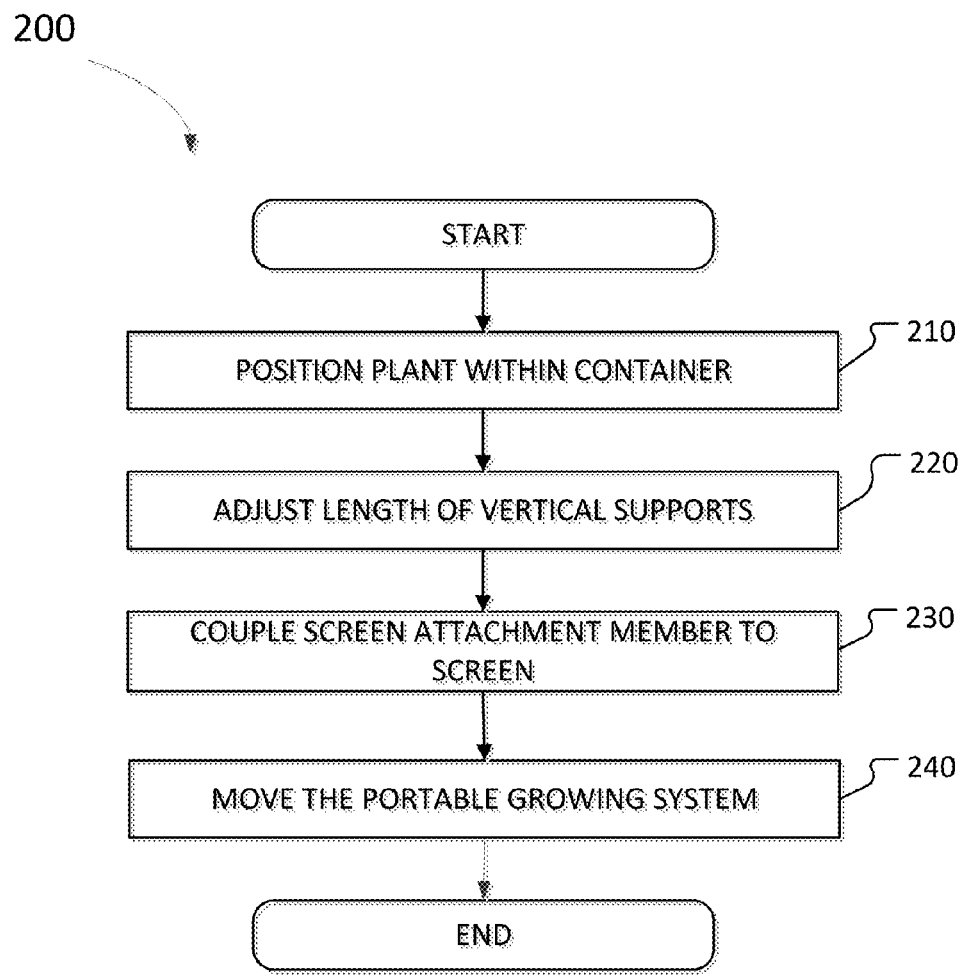
FIG. 2 depicts a method for utilizing a portable growing system, according to an embodiment.

FIG. 2 depicts a method 200 for utilizing a portable growing system. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

At operation 210, a plant, plant material or grow medium, etc. may be positioned within a container. The plant or plant material may include seeds, seedlings, clones a potted plant, etc.

At operation 220, vertical supports may be coupled to a screen, the container, and a base, wherein the screen is positioned over the container.

At operation 220, the length of the vertical supports may be adjusted. The length of the vertical supports may be adjusted based on the plant material positioned within the container and/or the lighting environment of the grow space where the portable growing system is positioned.

At operation 230, responsive to the spreading budding sites of the plant beginning to flower along the screen, a screen attachment member may be positioned around the perimeter of the screen. The screen attachment member may be configured to increase the surface area of the screen when desired, such that additional buds may flower at a surface that is planar to the screen without disrupting the growth or spread of the branches and flowering sites.

At operation 240, the portable growing system may be transported from a first grow space to a second grow space. The portable growing system may be transported to different grow spaces based on a plurality of different factors without disturbing adjacent plants or screens.

Figure 3:
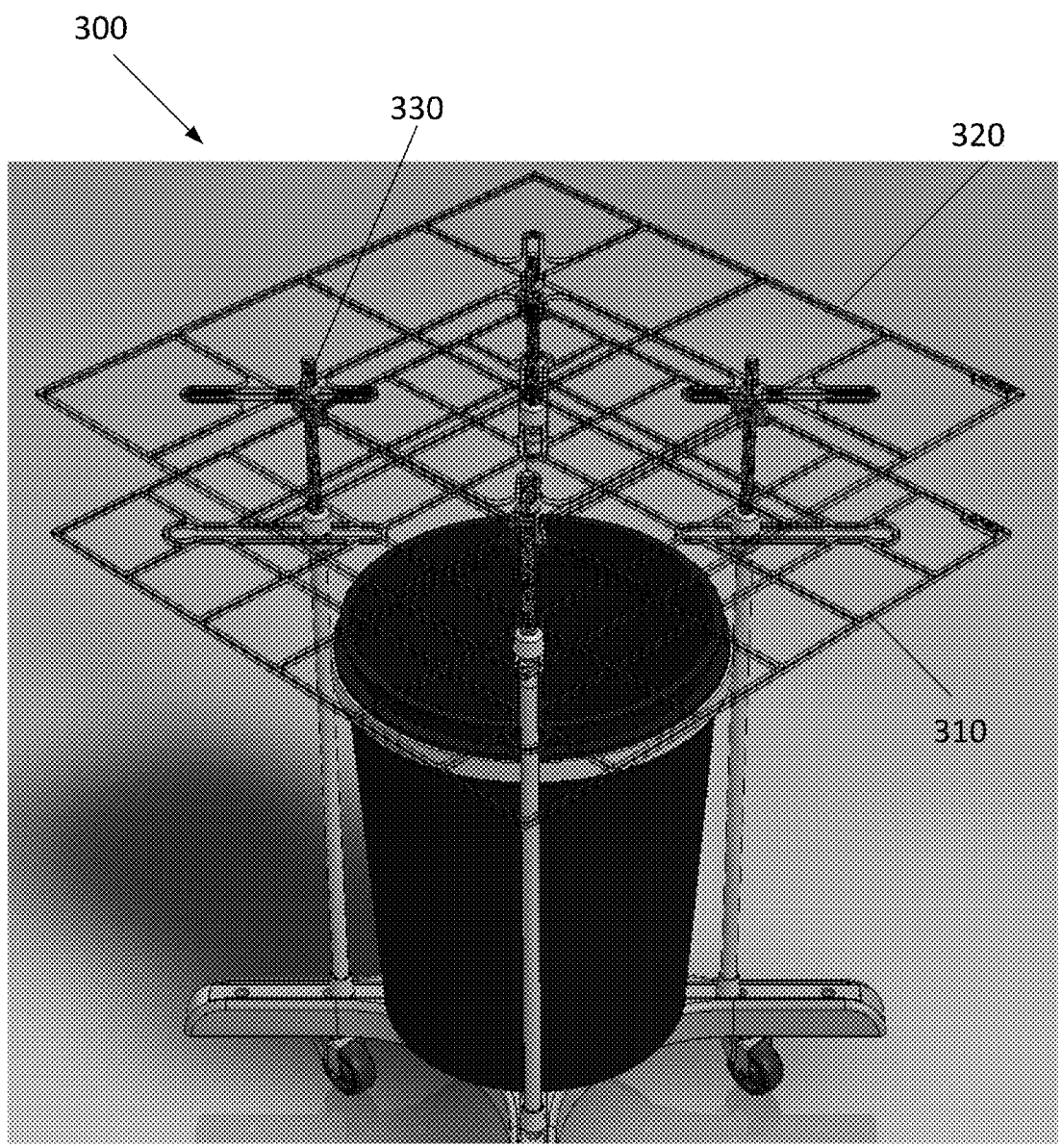
FIG. 3 depicts a portable growing system, according to an embodiment.

FIG. 3 depicts one embodiment of a portable growing system 300. Similar elements to those shown in FIG. 3 may be described in other sections of this application. Therefore, for the sake of brevity a further description of these elements is omitted. Portable growing system 300 may include first screen 310, second screen 320, and coupling mechanisms 330.

First screen 310 may be configured to be positioned below second screen 320, wherein first screen 310 and second screen 320 may have substantially the same sized edges. First screen 310 may be comprised of subsections of squares having a uniform first size, and second screen 320 may be comprised of subsections of squares having a uniform second size. In embodiments, the first size of the subsections of squares in the first screen 310 may be smaller than the second size of the subsections of squares in the second screen 320.

Figure 4:
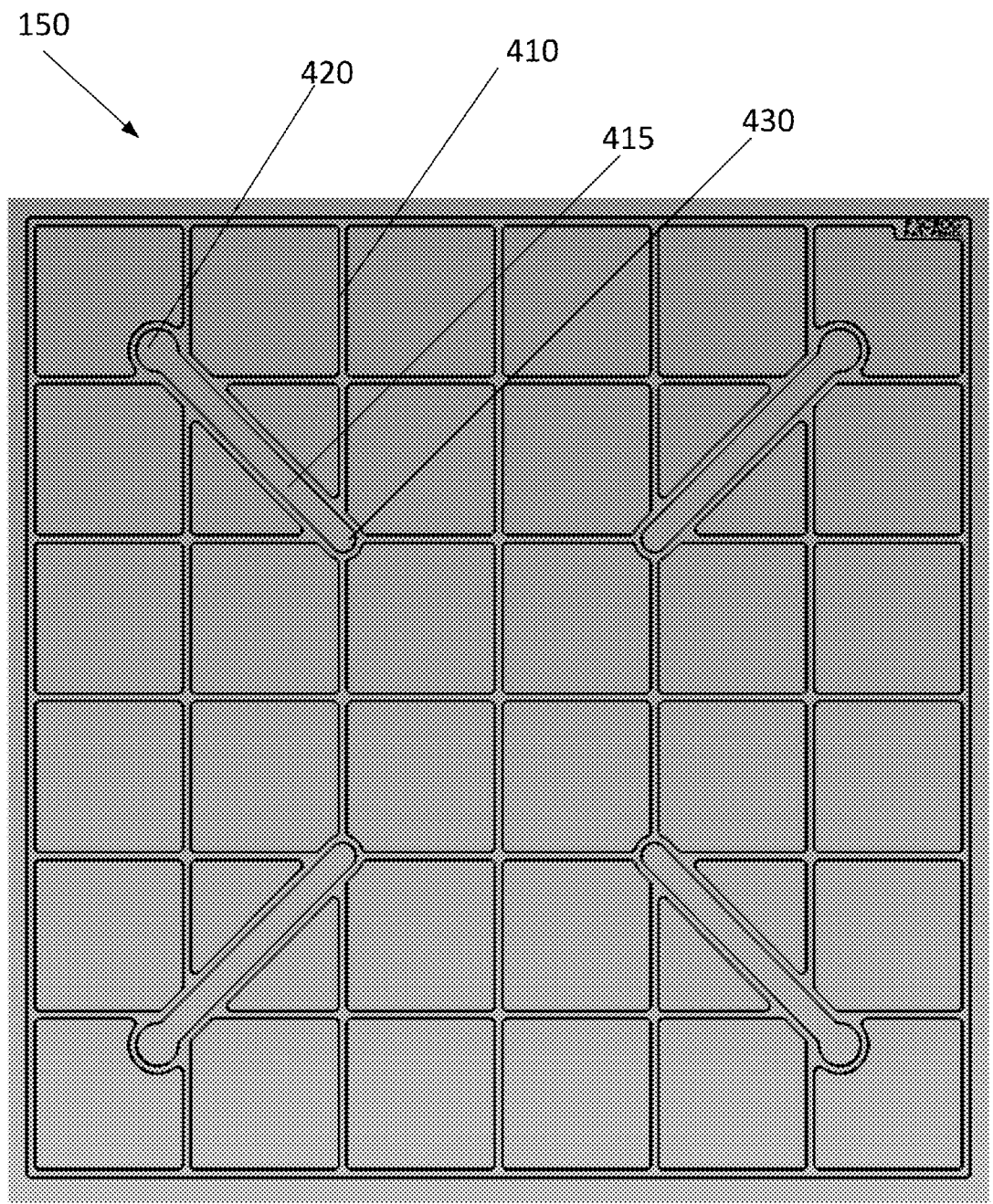
FIG. 4 depicts a first screen for a portable growing system, according to an embodiment.

Coupling mechanisms 330 may be vertical projections that are configured to be inserted into an upper end cap 144 of vertical supports, above the plane of first screen 310. In embodiments, coupling mechanisms 330 may project upward and be inserted through slots positioned in second screen 320. The slots positioned on second screen 320 may be configured to align with the slots positioned on first screen 310. Therefore, via coupling mechanisms and the slots, second screen 320 may be positioned above first screen 310. The second screen may be adjusted varying distances above the first screen FIG. 4 depicts one embodiment of a screen 150. Similar elements to those shown in FIG. 4 may be described in other sections of this application. Therefore, for the sake of brevity a further description of these elements is omitted.

As depicted in FIG. 4, screen 150 may include subsections of squares 410 having a uniform first size. The uniform squares 410 may extend throughout the body of screen 150.

As further depicted in FIG. 4, screen 150 may include slot 415, wherein slot 415 is configured to receive a cap of the vertical support. The cap vertical support may be inserted into slot 415 via first end 420, and be slid along the longitudinal axis 430 of slot 415. By sliding the vertical support through along longitudinal axis 430, a portable growing system may accommodate containers having different shapes and/or sizes. Furthermore, longitudinal axis 430 of slot 415 may have a narrower opening than first end 420 of slot 415. In embodiments, a cap of a vertical support may have diameter that is greater than the width of longitudinal axis 430, yet the diameter of the cap may be less than the width of first end 420. Therefore, the vertical projection may only be removed from screen 150 when aligned with first end 420 of slot 415.

Figure 5:
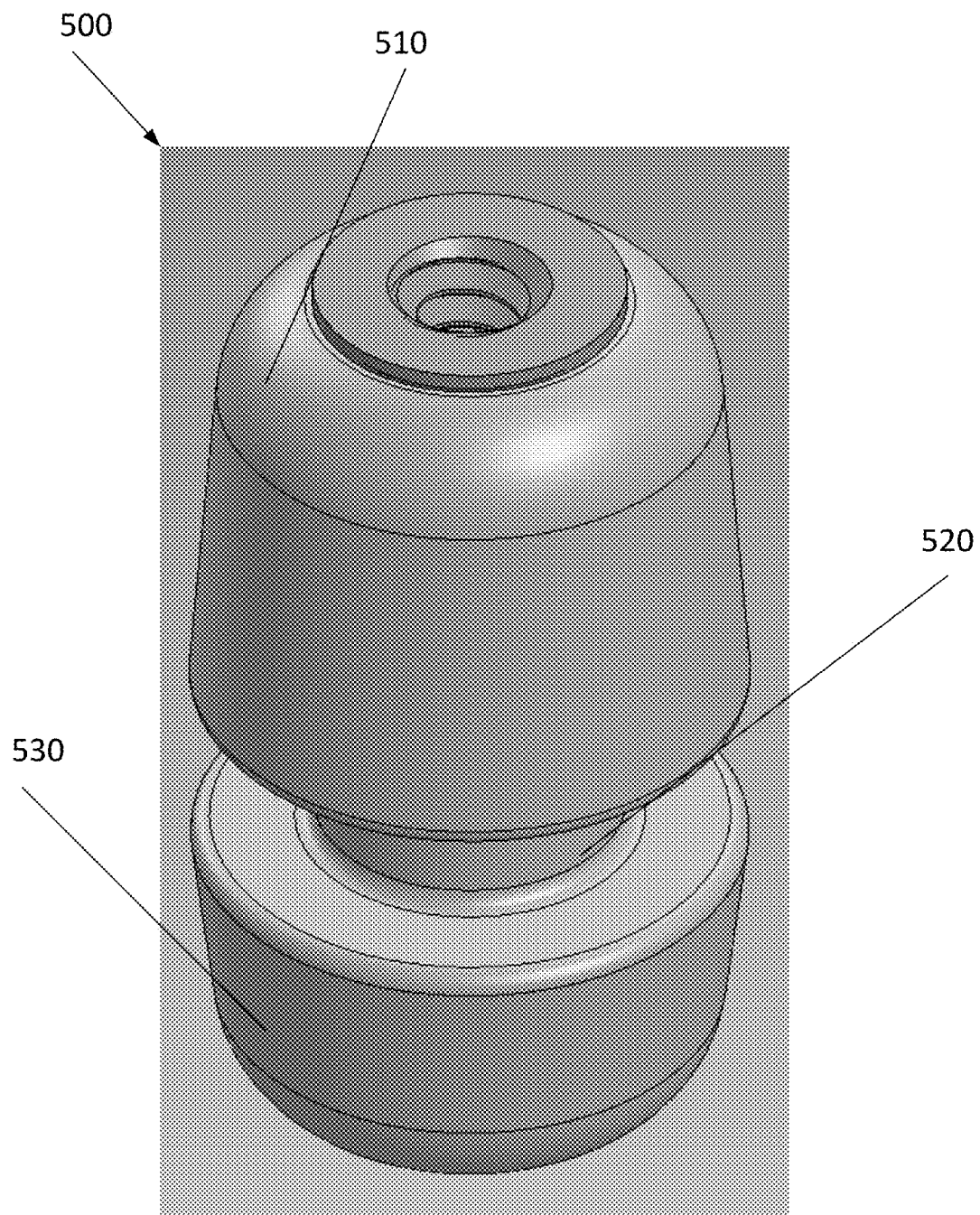
FIG. 5 depicts a cap of a vertical support, according to an embodiment.

FIG. 5 depicts one embodiment of a cap 500 of a vertical support. Similar elements to those shown in FIG. 5 may be described in other sections of this application. Therefore, for the sake of brevity a further description of these elements is omitted.

Cap 500 may be configured to be inserted into a slot of a screen. In embodiments, cap 500 may include an upper portion 510, a channel 520, and a lower portion 530. Channel 520 may be an indentation between upper portion 510 and lower portion 530, wherein the diameter of channel 520 is smaller than the diameter of upper portion 510 and lower portion 530. In embodiments, upper portion 510 may be configured to be positioned above a screen, lower portion 530 may be configured to be positioned below a screen, and channel 520 may be configured to be positioned planar to a screen. Because channel 520 has a smaller diameter than upper portion 510 and lower portion 530, cap 500 may be slid within a slot on a screen without being removed from the slot.

Figure 6:
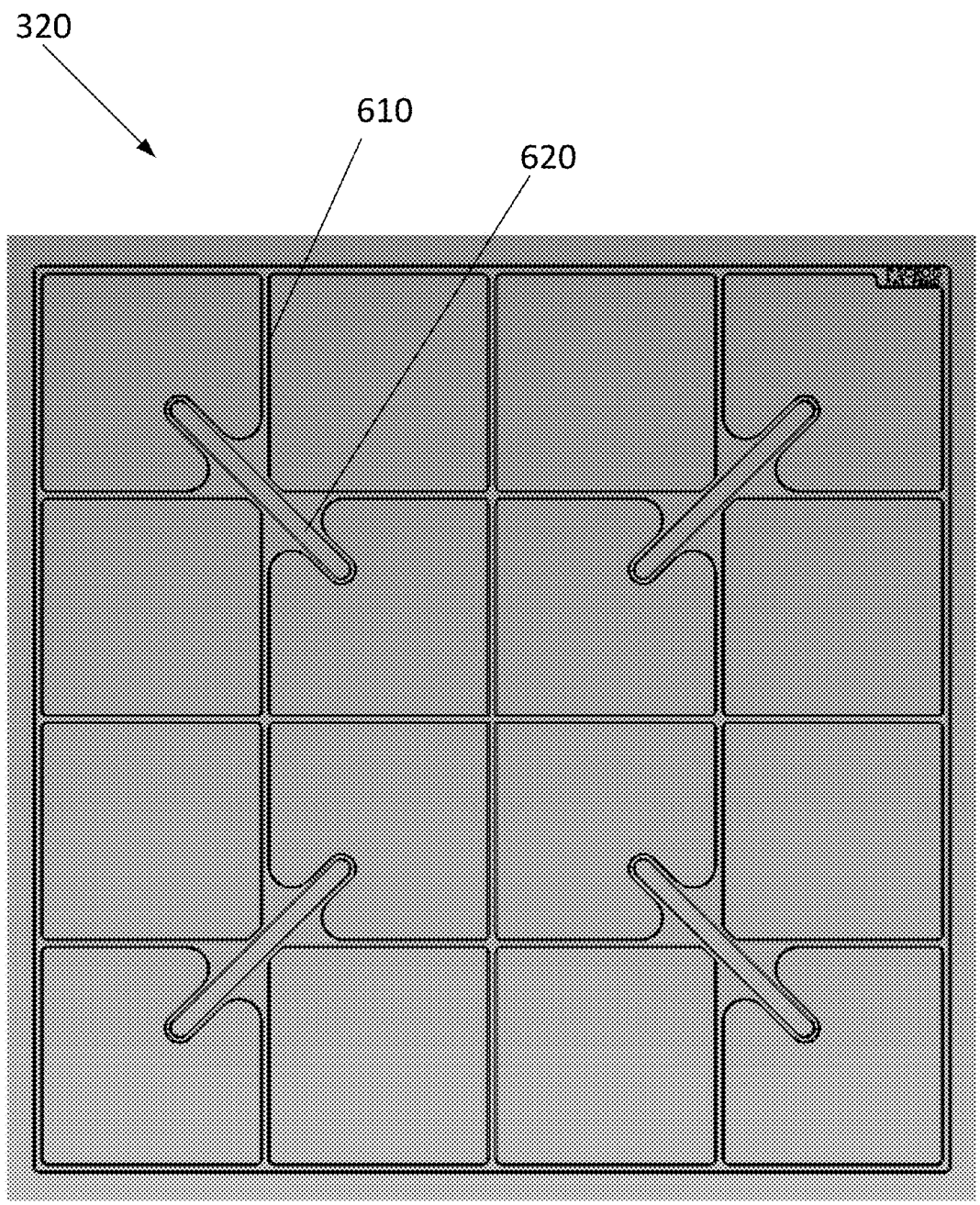
FIG. 6 depicts a second screen, according to an embodiment.

FIG. 6 depicts one embodiment of a second screen 320. Similar elements to those shown in FIG. 6 may be described in other sections of this application. Therefore, for the sake of brevity a further description of these elements is omitted.

As depicted in FIG. 6, screen 320 may include subsections of squares 710 having a uniform second size. The uniform squares 710 may extend throughout the body of screen 320. In embodiments, squares 710 may be larger in shape than the squares positioned in a first, lower screen. Yet, the size of screen 320 may remain the same as the first, lower screen.

As further depicted in FIG. 6, screen 320 may include a plurality of slots 620, wherein the slots 620 are configured to receive coupling mechanisms to removably couple screen 320 with a portable growing system. In embodiments, slots 620 may have a substantially uniform width.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A portable growing system for plants, the system comprising:
   a container that is configured to hold a plant while the plant is growing;
   a base that is configured to be a foundation for the portable growing system, the base including support structures and castors, the support structures being a set of perpendicular beams positioned beside the container, the castors being wheels positioned under the support structures;
   a first screen comprised of a first set of uniform squares, the first screen having a first vertical offset from an upper surface of the container, wherein the first set of uniform squares have sides of a first length;
   a vertical support configured to extend from the base to the first screen, wherein the vertical support is a telescopic support structure that is configured to extend and retract to change the first vertical offset of the first screen from the upper surface of the container;
   a second screen comprising of a second set of uniform squares, the second screen being vertically aligned with the first screen and having a second vertical offset from the upper surface of the container, wherein the second set of uniform mesh squares have sides of a second length which is greater than the first length.

2. The system of claim 1, wherein the first vertical offset can be changed independently of the second vertical offset.

3. The system of claim 2, wherein the second vertical offset can be changed independently of the first vertical offset.

4. A portable growing system for plants, the system comprising:
- a container that is configured to hold a plant while the plant is growing;
- a base that is configured to be a foundation for the portable growing system, the base including support structures and castors, the support structures being a set of perpendicular beams positioned beside the container, the castors being wheels positioned under the support structures;
- a first screen comprised of a first set of uniform squares, the first screen having a first vertical offset from an upper surface of the container, wherein the first set of uniform squares have sides of a first length;
- a vertical support configured to extend from the base to the first screen, wherein the vertical support is a telescopic support structure that is configured to extend and retract to change the first vertical offset of the first screen from the upper surface of the container, wherein the first screen has a plurality of slots, each of the plurality of slots having a first end positioned proximate to a corner of the first screen and a second end positioned proximate to a center of the first screen.

5. The system of claim 4, wherein the first end of the first screen slot has a wider width than the second end of the first screen.

6. The system of claim 5, further comprising:
- a cap configured to be positioned on an upper end of the vertical support, wherein the cap includes a channel that is configured to be slid within a slot of the plurality of slots.

7. The system of claim 6, wherein the cap has an upper and lower surface having a diameter that is less than the width of the first end and greater than the width of the second end of the slot.

8. The system of claim 7, wherein the vertical support is positioned adjacent to the container.

9. A portable growing system for plants, the system comprising:
- a container that is configured to hold a plant while the plant is growing;
- a base that is configured to be a foundation for the portable growing system, the base including support structures and castors, the support structures being a set of perpendicular beams positioned beside the container, the castors being wheels positioned under the support structures;
- a first screen comprised of a first set of uniform squares, the first screen having a first vertical offset from an upper surface of the container, wherein the first set of uniform squares have sides of a first length; a vertical support configured to extend from the base to the first screen, wherein the vertical support is a telescopic support structure that is configured to extend and retract to change the first vertical offset of the first screen from the upper surface of the container, wherein an upper surface of the support structures includes channels configured to receive a lower end of the vertical support.

* * * * *